United States Patent
Christopher et al.

(10) Patent No.: US 9,301,614 B1
(45) Date of Patent: Apr. 5, 2016

(54) MARSH DUCK HUNTING STOOL

(71) Applicants: Ronald Lee Christopher, Overland Park, KS (US); Andrew Wesley Christopher, Los Angeles, CA (US)

(72) Inventors: Ronald Lee Christopher, Overland Park, KS (US); Andrew Wesley Christopher, Los Angeles, CA (US)

( * ) Notice: Subject to any disclaimer, the term of this patent is extended or adjusted under 35 U.S.C. 154(b) by 0 days.

(21) Appl. No.: 14/121,434

(22) Filed: Sep. 6, 2014

Related U.S. Application Data

(60) Provisional application No. 61/960,200, filed on Sep. 13, 2013.

(51) Int. Cl.
  *A47C 3/40* (2006.01)
  *A01M 31/02* (2006.01)
  *A47C 7/62* (2006.01)
  *A47C 7/00* (2006.01)

(52) U.S. Cl.
  CPC .............. *A47C 3/40* (2013.01); *A01M 31/02* (2013.01); *A47C 7/004* (2013.01); *A47C 7/62* (2013.01)

(58) Field of Classification Search
  CPC ............ A47C 3/40; A47C 7/004; A47C 7/62; A01M 31/02
  USPC ......................................... 297/4, 338, 344.18
  See application file for complete search history.

(56) References Cited

U.S. PATENT DOCUMENTS

| | | | | |
|---|---|---|---|---|
| 3,467,033 A | * | 9/1969 | Remer | A47C 9/10 248/156 |
| 4,098,478 A | * | 7/1978 | Spitzke | A47C 9/10 248/156 |
| 4,451,080 A | * | 5/1984 | Nix | A61H 3/00 297/4 |
| 5,673,966 A | * | 10/1997 | Morton, Jr. | A47C 9/10 297/4 |
| 5,975,635 A | * | 11/1999 | Parpala | A47C 9/10 297/338 |
| 2015/0054328 A1 | * | 2/2015 | Barstad | A47C 4/03 297/440.24 |

* cited by examiner

*Primary Examiner* — Anthony D Barfield

(57) ABSTRACT

In accordance with one embodiment a marsh duck hunting stool, comprised of unitary construction having no detachable members, provides a compact, lightweight, floatable structure, with simple functionality, primarily used in a duck marsh environment. The stool includes a horizontally oriented seat platform with a single, elongated, vertically oriented support member. The support member comprises two tubular members, one sliding within the other, providing a plurality of seat height settings. A foot and stake assembly is pivotally disposed on the bottom end of the sliding tubular member. The foot and stake assembly limits soft soil penetration and provides fore and aft/side to side stability. The sliding tube rotates within the foot and stake assembly thereby providing 360 degree pivot of the seat platform.

15 Claims, 6 Drawing Sheets

Figure 4:
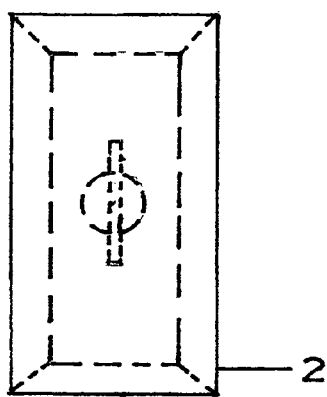

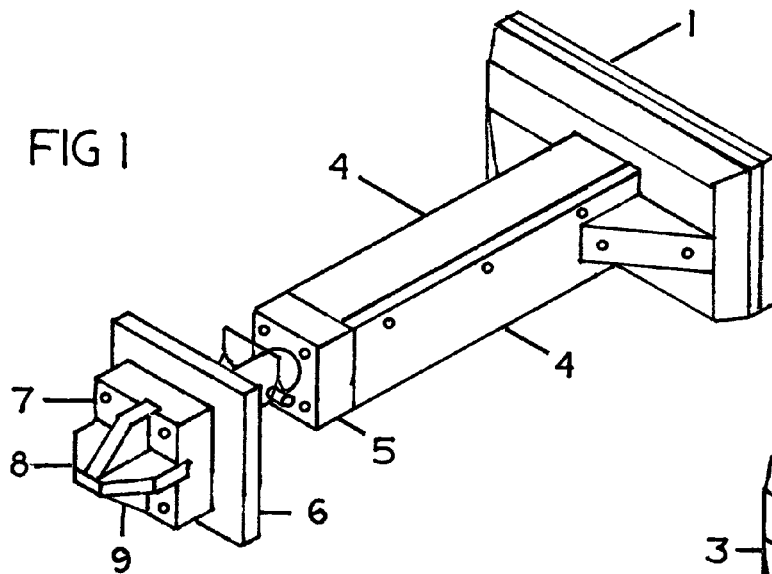
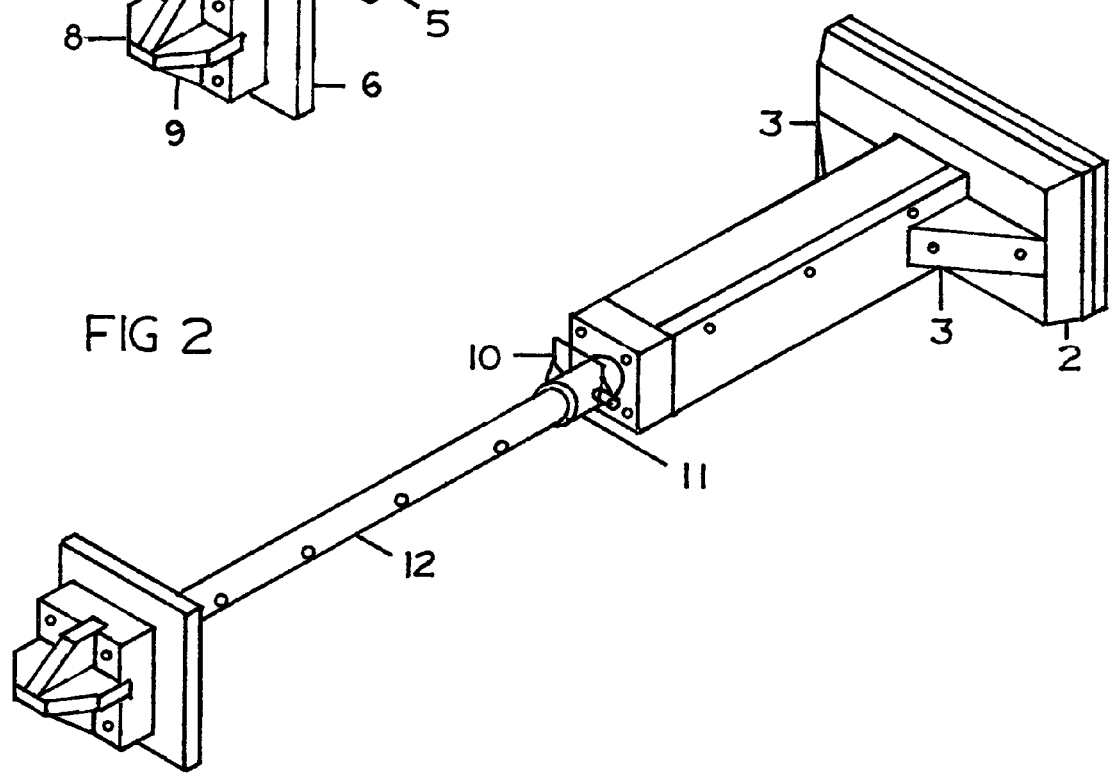

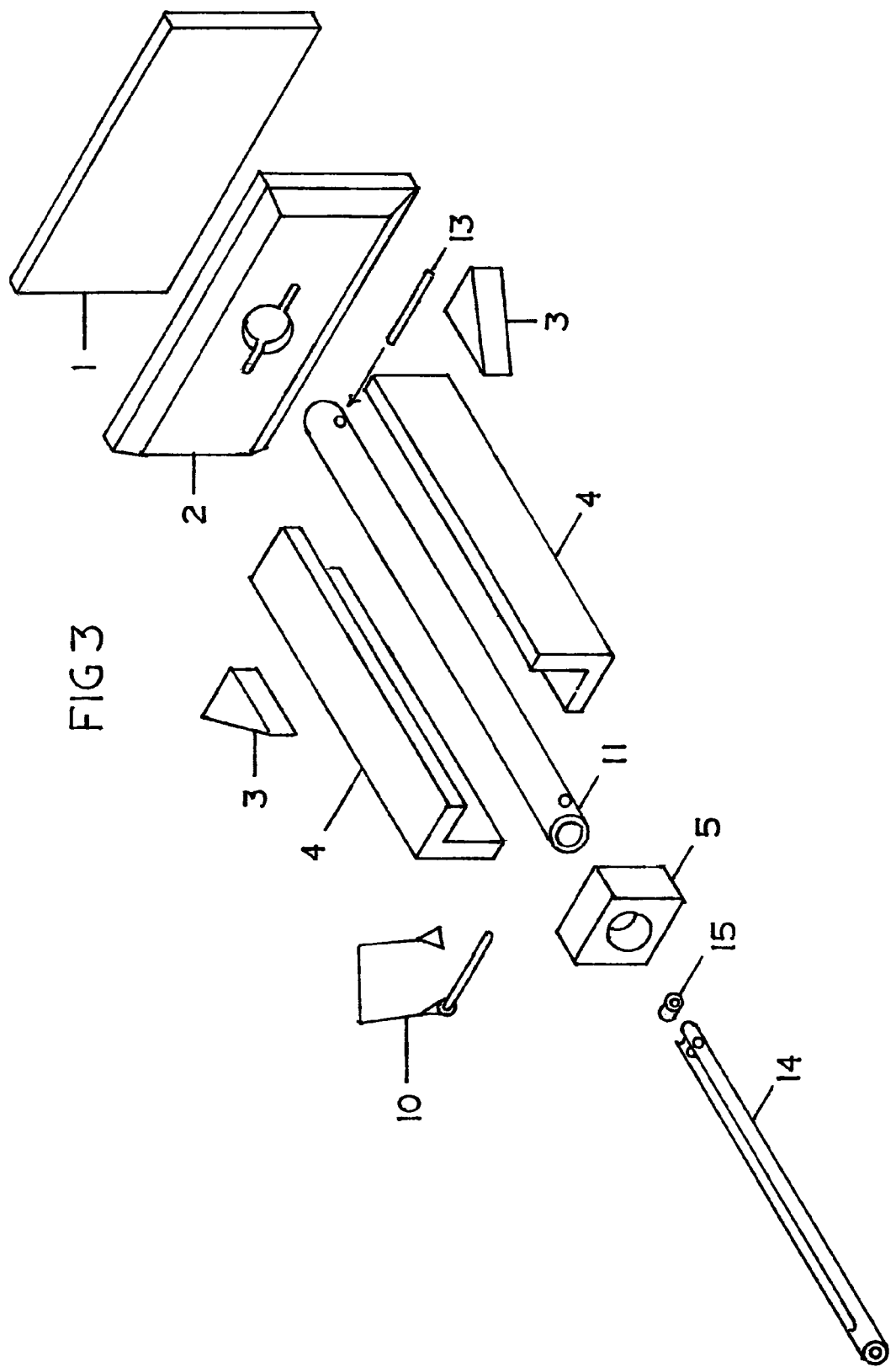

FIG 12
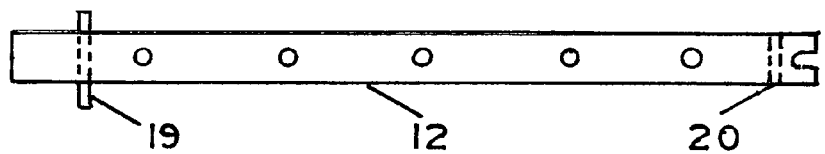
FIG 13
FIG 14  FIG 15  FIG 16
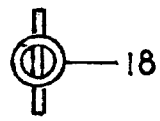  
FIG 17  FIG 18  FIG 19
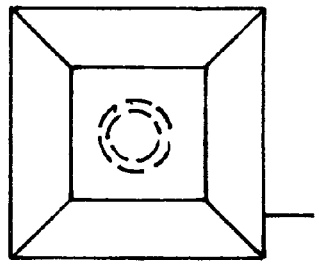 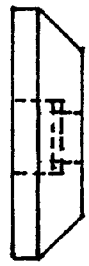 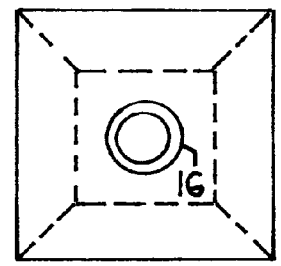
FIG 20  FIG 21  FIG 22
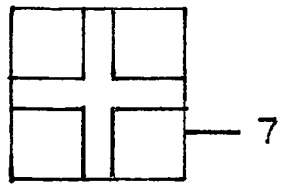  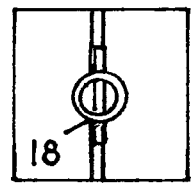

MARSH DUCK HUNTING STOOL

CROSS-REFERENCE TO RELATED APPLICATIONS

This application claims the benefit of provisional patent application No. 61/960,200 filed 2013 Sep. 13 by the present inventors

BACKGROUND

Prior Art

The following is a tabulation of some prior art that presently appears relevant:

U.S. Patents

| Pat. No. | Kind Code | Issue Date | Patentee |
|---|---|---|---|
| 6,893,097 | B1 | May 17, 2005 | Joseph Martin, Alan Ebensperger |
| 3,283,733 | A | Nov. 8, 1966 | John Boerma |
| 5,673,966 | A | Oct. 7, 1997 | William Morton Jr. |
| 2,720,249 | A | Oct. 11, 1955 | Nels Peterson |
| 1,218,357 | A | Mar. 6, 1917 | Charles Bauer |
| 2,607,398 | A | Aug. 19, 1952 | Aaron Andrews |
| 4,433,870 | A | Feb. 28, 1984 | Donald Bairen, Thomas Lucas |
| 2,877,828 | A | Mar. 17, 1959 | Ernest Barnette |
| 3,381,635 | A | May 7, 1968 | George Pforr |
| 3,467,033 | A | Sep. 16, 1969 | Russell Remer, Marvin Sienkiewicz |
| 5,975,635 | A | Nov. 2, 1999 | Dave Parpala |
| 6,035,572 | A | May 14, 2000 | Lloyd Goode |
| 6,467,843 | A | Oct. 22, 2002 | Neil Rossborough |
| 3,177,825 | A | Apr. 13, 1965 | Hicks Jones |
| 5,470,038 | A | Nov. 28, 1995 | John Clark |
| 4,098,478 | A | Jul. 4, 1978 | Arthur Spitzke |
| 6,176,545 | A | Jan. 23, 2001 | John Hambleton |
| 2,634,795 | A | Apr. 14, 1953 | Julius Bishop |
| 401,302 | A | Apr. 9, 1889 | Edward Purdy |
| 3,495,554 | A | Feb. 17, 1970 | Adam Wagner |

Non Patent Literature Documents

Dick's Web Site Advertising "Avery Marsh Seat"
Big Supply Shop Web Site Advertising "MOJO Mud Seat"
Cabela's Web Site Advertising "Cabela's Northern Flight Marsh Chair"

Marsh duck hunting is an extremely difficult and strenuous activity. Marsh duck hunters, usually burdened with heavy clothing, boots, and gloves, will wade to their chosen stationary location to hunt in a flooded marsh having water depths of 6" to 35". This flooded marsh will have a soft muddy, uneven underwater ground surface making it difficult to wade while maintaining balance. This flooded marsh includes vegetation having numerous forms such as trees, bushes and grasses often with underwater limbs and roots. Marsh duck hunters must also transport essential equipment such as gun, decoys and a device for sitting when wading to their chosen location. Upon arrival at the chosen location they will deploy decoys and then seek rest and concealment. This activity is often conducted during the dark, pre-dawn hours.

Marsh duck hunters therefore need a stool to sit on for rest and concealment. The stool needs to be compact and lightweight so it is easy to transport. When seeking concealment marsh duck hunters will utilize available vegetation where they will frequently encounter an underwater root system. The stool will therefore need to have a combination foot and stake system capable of penetrating this root system so the foot and stake can be embedded in the ground. When embedded, the foot and stake needs to provide stability with limited ground surface penetration of the stake. A stable stool will assist marsh duck hunters with maintaining their balance while sitting. Limiting ground surface penetration will maintain a constant seat height. The entire embodiment of the stool needs to be of a simple, single assembly having all non-detachable members. As such, marsh duck hunters will not have to contend with folding/unfolding or assembly/disassembly of the members nor will they have to contend with dropping and losing members in the water. The stool needs to be reliable thus it needs to be simple in functionality and strong in construction. The stool needs to have a pivotally mounted seat platform that allows marsh duck hunters to track their prey while remaining concealed with the lowest possible profile. The height of the seat from the ground needs to be adjustable to accommodate various water depths. Marsh duck hunters are constantly on guard to prevent dropping of their equipment in the water and thus loosing it. Therefore, the entire single stool assembly needs to float.

Single support post, pedestal type stools have been developed in the past for use in various outdoor activities. Some of the related prior art is designed for portability including features described as foldable, assembly/disassembly and collapsibility. These features have advantages for use on dry land but they become disadvantageous for use in a duck marsh. Following is a discussion of this prior art:

U.S. Pat. No. 3,283,733 Portable Collapsible Sportsman Seat—This collapsible seat is designed for dry land portability. The seat comprises multiple detachable members. The support member (14) is made of metal thus heavy and sinkable. The pivotally mounted seat (12) is a single center point design on bottom side of seat which creates a high wear, unstable joint. The height of seat (12) is fixed since support 14 is of a fixed length. The narrow, tubular pointed stake (16) will move easily side to side in soft soil conditions.

U.S. Pat. No. 1,218,357 Portable Seat—This is an improved seat for portability. It comprises multiple detachable members. The seat (6) is rigidly attachment (8). The height of seat (6) is fixed since post (8) is of a fixed length. The narrow, tubular pointed stake (lower end of 8) will move easily side to side in soft soil conditions.

U.S. Pat. No. 2,607,398 Combined Stool and Fishing Rod Support—This stool is designed primarily for fishing from dry land. The stool is made of metal thus heavy and sinkable. The seat (30) is rigidly affixed to standard tube (10). The height of seat (30) is fixed since standard tube (10) is of a fixed length. The narrow, sharp stake (lower end of 10) will move easily side to side in soft soil conditions.

U.S. Pat. No. 4,433,870 Collapsible Sportsman Seat—This seat is designed primarily for hunting or fishing on dry land. This seat comprises of all metal and plastic parts thus heavy and sinkable. Seat (2) is rigidly affixed to post (7) but with a mechanism for folding. The lower platform (10) with extendable feet and no stake is designed for a flat firm non-vegetative ground surface. Pin (8) can become detached from tube (7). Tube (5a) can become detached from tube (7).

U.S. Pat. No. 2,877,828 Folding Fisherman's Seat—This seat is designed for fishing from dry land and folds for portability. The designed detail and no mention of lightweight materials indicate this seat is constructed of metal thus heavy and sinkable. The support shaft (14) has two detachable members (16, 18). Seat (12) is rigidly affixed to upper support shaft (16) with a mechanism for folding. The height of seat (12) is fixed since support shaft (10) is of a fixed length. The narrow, pointed stake (lower end of 18) will move easily side to side in soft soil conditions.

U.S. Pat. No. 3,381,635 Portable Utility Chair—This folding chair is designed for use on dry land. Seat (16) is rigidly affixed to post (14) but with a mechanism for folding. The height of seat (16) is fixed since post (14) is of a fixed length. The chair is made of metal and thus heavy and sinkable. The flat base (11) without a stake is designed for use on firm ground.

U.S. Pat. No. 3,467,033 Folding Stool—This stool is designed for use on dry land. Post (20) and base (21) are made of metal thus heavy and sinkable. The stool has multiple detachable members. Seat (10) is rigidly attached to post (20) but removable for transport. The height of seat (10) is fixed since post (20) is of a fixed length.

U.S. Pat. No. 6,467,843 Collapsible Seat—This is a collapsible seat for portability to be used on dry ground. The seat has multiple detachable members. The seat height is adjustable by aligning one of a plurality of holes in sliding inner tube (52) with lock pin (62) by sight or feel. Seat (12) is rigidly affixed to inner member (52) but removable for transport. The flat base (11) without a stake is designed for a firm ground surface.

U.S. Pat. No. 3,177,825 Sportsman Chair—This chair is designed as a fishing and sports spectator chair for use on dry ground. The chair is made of metal and thus heavy and sinkable. The height of seat (46) is fixed since post (12) is of a fixed length. The pivotally mounted seat (46) is a single center point design which creates a high wear, unstable joint. The folding chair design has complicated functionality. The narrow, pointed lower end of post (12) will move easily side to side in soft soil conditions.

U.S. Pat. No. 4,098,478 Portable Folding Seat—This foldable seat is designed for sports spectators on hard surfaces. The seat is constructed of plastic, which if durable enough for duck marsh duty, will be sinkable. The height of seat (12) is fixed since support member (14) is of a fixed length. Seat (12) is rigidly affixed to support member (14) is with mechanism for folding. The narrow, pointed prong (60) will move easily side to side in soft soil conditions. The pointed prong (60) is a detachable member.

U.S. Pat. No. 6,176,545 Portable Seat—This seat is designed for portability on dry land. Seat (18) is rigidly affixed to post (12) but removable for transport. The height of seat (18) is fixed since post (12) is of a fixed length. The seat post (12) is made of metal thus heavy and sinkable. The narrow, pointed lower end of post (12) will move easily side to side in soft soil conditions.

U.S. Pat. No. 3,495,554 Hunting Stool—This stool is designed primarily for dry land spectator sports, hunters and fishermen. The stool is made of metal thus heavy and sinkable. This stool has an extremely complex seat folding design, Seat (15) is rigidly affixed to head piece (3) but collapsible for transport. Inner pipe (1a) is pinned to one position for use and another position for transport thus seat height for use is fixed. Press stud (1e) alignment with boring (1d) in outer pipe (1a) is by sight and feel of guide slot (1h) in inner pipe (1a) and guide slot (1g) in outer pipe (1a). Inner pipe (1a) can become detached from outer pipe (1a).

Some of the related prior art claims suitability for use by the "duck hunter" as generally described, and in generally described conditions such as marsh, mud, muddy, sand, swamp, swampy, wetland, shallow, submerged, wet, damp, or soft. With consideration of the previous specific descriptions of the marsh duck hunter and the duck marsh, this prior art continues to include disadvantageous features and fails to include a totality of advantageous features for the activity of marsh duck hunting. A discussion of this prior art is as follows:

U.S. Pat. No. 6,893,097 Outdoor Stool System—The stake (52) and associated pivoting flared feet members (54, 56) is designed primarily for firm flat ground. The stool design comprising locking collar, pivoting feet, and necessary strength of support members, with no mention of the use of lightweight materials, indicates stool is made of metal thus heavy and sinkable. Stool comprises of detachable seat shaft (42) and locking collar (30). The "friction" engagement of seat shaft (42) by upper collar (30) could allow slippage of seat shaft (42). The pivotally mounted or fixed mounted seat (40) is a single center point design on bottom side of seat which creates a high wear, unstable joint.

U.S. Pat. No. 2,634,795 Swivel Seat—Since the basic design description makes reference to threads, collars, pins, and recesses this seat is deemed to made from metal thus heavy and sinkable. The seat has detachable members described as follows: a. there is no provision to retain post (20) if cotter key (32) is removed thus post (20) can slide out and become detached from upright (10) b. there is no provision to retain collar (22) if post (20) becomes detached from upright (10) and screw (26) becomes loose, c. there is no provision to retain anchor (38, 40, 42) if cotter pin (48) is removed thus this anchor can slide off and become detached from upright (10), d. cotter pins (32, 48) have no provisions to retain them when they are removed from their slots. The hold force between set screw (26) and the side wall of post (20) can loosen from dynamic vertical and horizontal (rotational) forces. The pivotally mounted seat (14) is a single center point design on bottom side of seat which creates a high wear, unstable joint. The narrow, pointed lower end of upright (10) will move easily side to side in soft soil conditions.

U.S. Pat. No. 5,673,966 Duck Hunters Toole Seat—The seat (1), retaining pin (7), and disc (6) are all detachable members. The seat is made primarily of metal thus heavy and sinkable. The pivotally mounted seat (1) is a single center point design on bottom side of seat which creates a high wear, unstable joint. The lower disc (6) is adjustable to limit the spear (6) penetration of variable ground surface densities but the seat height is fixed since support tube (3) is of a fixed length. The narrow, pointed lower end of support tube (3) will move easily side to side in soft soil conditions.

U.S. Pat. No. 2,720,249 Vertically Adjustable Pedestal Supported Revolving Stool—This stool has multiple detachable members for means of disassembly/assembly for transport/use respectively. Pedestal (3) is detachable and sinkable. Anchoring post (5) and base (2) have no retention provisions when set screws (23, 14) are removed thus they can become detached and need reassembly. Set screws (23, 14) have no retention system when they are removed. The seat height is fixed since the pedestal (3) is of a fixed length. The pivotally mounted seat (1) is a single center point design on bottom side of seat which creates a high wear, unstable joint. The large base (2) is best suit able for flat surfaces. The narrow, pointed anchoring post (5) will move easily side to side in soft soil conditions.

U.S. Pat. No. 5,975,635A Portable Pedestal Seat—This seat has no foot to limit ground surface penetration thus constant adjustment of the stake (ref tube 16) length would be necessary since the seat would continue to sink from the weight and motion of the occupant. Sliding tube (16) is detachable. The entire seat is made of "structural plastic". Structural plastic durable enough for duck marsh duty is sinkable. The seat (11) is rigidly affixed to pedestal (14).

Alignment of seat height adjustment holes in large tube (15) and small tube (16) are by sight and feel.

U.S. Pat. No. 6,035,572 Combination Gun Rest, Stool, Walking Stick—This is a combination stool, walking stick. By its own description this stool is designed for use at "waters edge". The support and foot members of this stool are constructed of PVC having "suitable physical and mechanical properties". PVC with "suitable physical and mechanical properties" strong enough for duck marsh duty will sink. The pivotally mounted seat (1) is a single center point design on bottom side of seat which creates a high wear, unstable joint. The stool has multiple detachable members that need to be assembled and disassembled. The narrow, pointed lower end of upright (33) will move easily side to side in soft soil conditions. The seat (35) attachment to upright member (33) is fixed with means for removal and storage for transport.

U.S. Pat. No. 5,470,038 Self Stabilizing Seat Support—This seat base (12) attachment to main shaft (11) is rigidly fixed. The seat height is fixed since main shaft (11) is of a fixed length. The folding seat and folding foot designs are deemed to be made of a durable, rigid material such as metal or high strength plastic due to their complex functionally. Metal or high strength plastic durable enough for duck marsh duty is sinkable. The narrow pointed stabilizer shaft (10) will move easily side to side. The wide spreading stabilizer foot (30) is for use on flat, smooth surfaces.

U.S. Pat. No. 401,302 Hunter's Portable Stool—Seat (A) attachment to support (C) is fixed. The seat height is fixed since support (C) is of a fixed length. The narrow, pointed stake at the lower end of support (C) will move easily side to side in soft soil conditions. Wood seat with back support and metal post assembly is large and heavy.

Some NPL has been found on related prior art that is commercially available. Considering many design details are omitted from the pertinent available literature whereby further disadvantages could possibly be cited and with consideration of the previous specific descriptions of the marsh duck hunter and the duck marsh, this prior art can still be shown to include disadvantageous features and fail to include a totality of advantageous features for the activity of marsh duck hunting. A discussion of this prior art is as follows:

Dick's Web Site Advertising "Avery Marsh Seat": The support post and lower supports are aluminum which will make the entire seat sinkable. Seat is rigidly affixed to the support post with a folding mechanism. The supports are foldable but too wide for effective use in a vegetative under growth of a duck marsh. The narrow, pointed stake on the lower end of the support will move easily side to side, fore and aft in soft soil conditions.

Big Supply Shop Web Site Advertising "MOJO Mud Seat": The stake and associated pivoting flared feet members are designed primarily for flat ground and would not be effective in the vegetative undergrowth of the duck marsh. The stool is made of steel thus heavy and sinkable. Seat is rigidly affixed to the top of the shaft.

Cabela's Web Site Advertising "Cabela's Northern Flight Marsh Chair": The support post and lower supports are aluminum which will make the entire seat sinkable. Seat is rigidly affixed to the support post and includes a folding mechanism. The supports are foldable and too wide for effective use in a vegetative under growth of a duck marsh. The narrow, pointed stake on the lower end of the support will move easily side to side, fore and aft in soft soil conditions.

SUMMARY

In accordance with one embodiment a marsh duck hunting stool comprises a pivot seat, with multiple height settings having a unitary construction, light weight, compact size and floatability, simple in functionality with few moving parts.

ADVANTAGES

Thus several advantages of one or more aspects are that the marsh duck hunting stool comprises a more compact size (less than 22" shortest length). Other advantages of one or more aspects are that the marsh duck hunting stool comprises a combination of lighter weight materials for a total weight of less than 5 lbs. Other advantages of one or more aspects are that the marsh duck hunting stool comprises a unitary construction with no detachable members. Other advantages of one or more aspects are that the marsh duck hunting stool comprises a combination of members made of floatable material, schedule 40 PVC and metal such that the entire assembly is floatable. Other advantages of one or more aspects are that the marsh duck hunting stool comprises simple and reliable construction with just 3 moving members. Other advantages of one or more aspects are that the marsh duck hunting stool comprises a plurality of seat height settings. Other advantages one or more aspects are that the marsh duck hunting stool comprises self alignment of through holes for seat height adjustments. Other advantages of one or more aspects are that the marsh duck hunting stool comprises a more ridged and reinforced horizontal seat to vertical support member attachment. Other advantages of one or more aspects are that the marsh duck hunting stool comprises a 360 degree pivoting seat. Other advantages of one or more aspects are that the marsh duck hunting seat comprises a foot and stake assembly pivotally attached to the lower end of the sliding member of the vertical seat support structure. Other advantages of one or more aspects are that the marsh duck hunting stool comprises a wider and blunter stake profile. Other advantages of one or more aspects will be apparent from a consideration of the drawings and ensuing description.

DRAWINGS

Figures

FIG. 1. Shows a three dimensional view of the complete assembly of the marsh duck hunting stool in the most compact position.

FIG. 2. Shows a three dimensional view of the complete assembly of the marsh duck hunting stool in the longest position.

FIG. 3. Shows an exploded view of members comprising the upper end of the marsh duck hunting stool.

FIGS. 4 to 10. Shows planned views revealing details of the upper end members.

Figure 11:
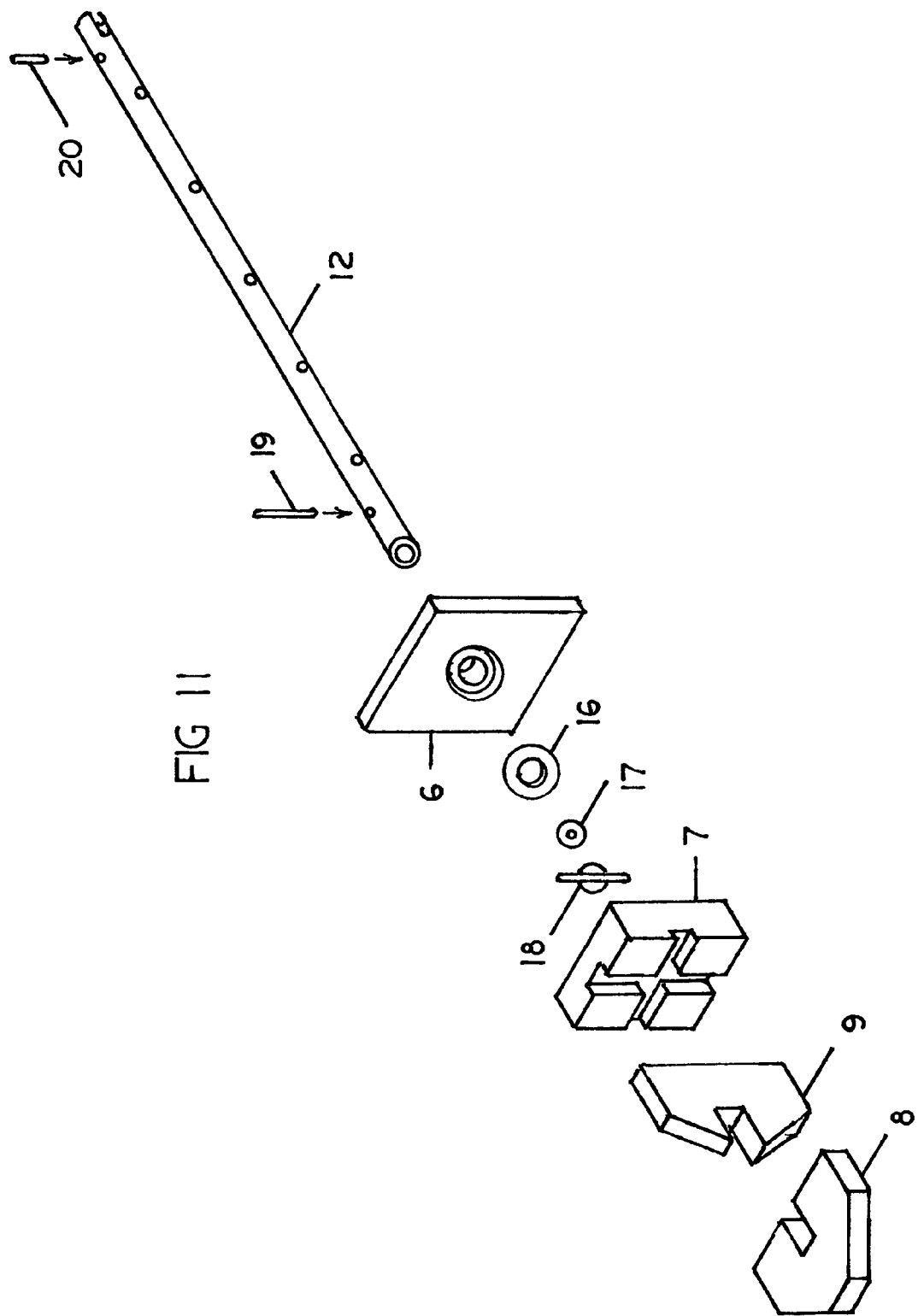

FIG. 11. This exploded view shows the lower end of the marsh duck hunting stool

FIGS. 12 to 22. Shows planned views revealing details of the lower end members.

Figure 23:
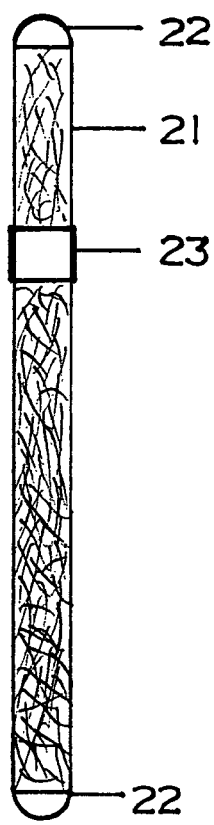
Figure 24:
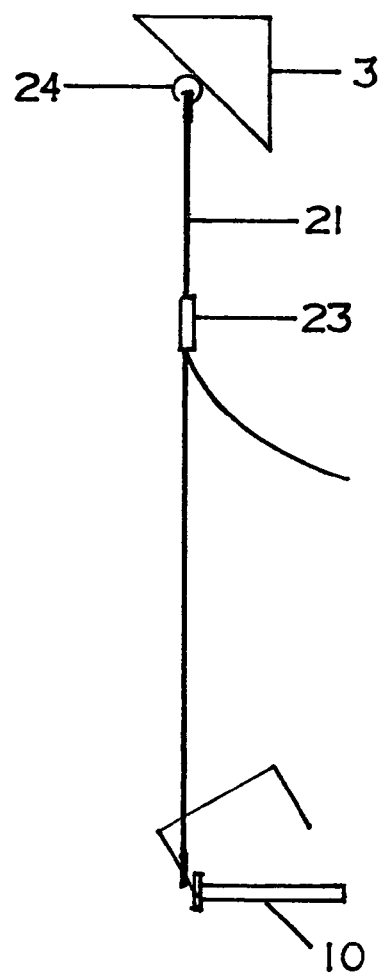

FIGS. 23 and 24. Shows planned views of marsh duck hunting stool carrying device

DRAWINGS

Reference Numerals

1 Seat Cushion
2 Seat
3 Gusset
4 Seat Base
5 End Cap

6 Foot
7 Stake Base
8 Top Stake
9 Bottom Stake
10 Wire Lock Pin
11 Stationary Tube
12 Sliding Tube
13 Stationary Pin
14 Retainer tube
15 Spacer tube
16 Retention Washer
17 Rotating Washer
18 Stationary Washer
19 Rotating Pin
20 Sliding Pin
21 Strap
22 D Ring
23 Strap Adjuster
24 Screw Eye

DETAILED DESCRIPTION

First Embodiment—FIGS. 1-24

FIG. 1 to FIG. 10

Made from floatable material, comprising a predetermined cross-sectional shape, a seat 2 is horizontally disposed. A seat cushion 1 is permanently glued to the topside of seat 2. Made from floatable material, comprising an elongated, hollow, predetermined cross-sectional shape (FIGS. 7, 8), an upper end of a seat base 4 is rigidly attached, at a right angle, to the underside of Seat 2. Made from floatable material, a gusset 3 is rigidly attached to opposite sides of seat base 4 and the underside of seat 2, thereby providing additional strength to the attachment of seat 2 to seat base 4.

Made from floatable material, comprising a predetermined cross-sectional shape, an end cap 5 is attached to the lower end of seat base 4, thereby providing additional strength to the lower end of seat base 4.

Made from floatable material, comprising a predetermined cross-sectional shape, a foot 6 is horizontally disposed. Providing stability and resistance to soft ground penetration, foot 6 is pivotally attached to the lower end of a sliding tube 12 (FIG. 2).

Made from floatable material, with center points in alignment, a stake base 7 comprising a predetermined cross-sectional shape, is rigidly attached to the under side of foot 6. Made from floatable material, a top stake 8 and a bottom stake 9 interlock, thereby providing mutual lateral strength (FIG. 11). Comprising a wide, blunt profile, top stakes 8 and bottom stake 9 are rigidly attached to the underside of stake base 7.

Made from round schedule 40 PVC pipe, a stationary tube 11 is disposed inside the full length hollow center of seat base 4 (FIG. 3). Surrounding stationary tube 11, a through hole at the center point of end cap 5 (FIG. 3) disposes stationary tube 11 on the lateral center point of seat base 4. Sufficient in length, a lower portion of stationary tube 11 extends through end cap 5 exposing a lower through hole in stationary tube 11.

Made from round schedule 40 PVC pipe, sliding tube 12 is slidably disposed inside stationary tube 11. Comprising a failsafe connection, a wire lock pin 10 is disposed in the lower through hole of stationary tube 11 and one of a plurality of longitudinally aligned through holes in sliding tube 12.

Figure 5:
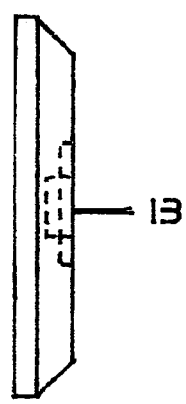
Figure 6:
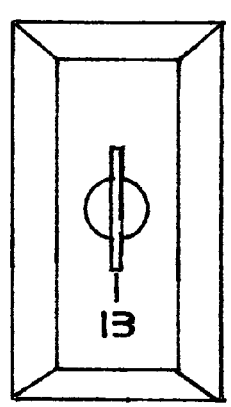
Figure 7:
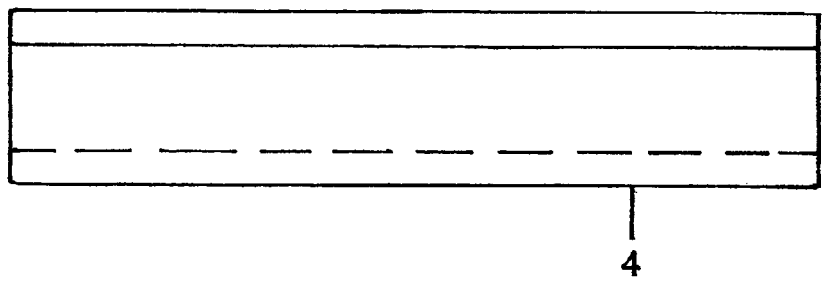
Figure 8:
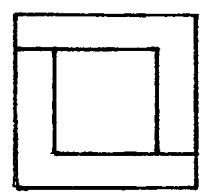
Figure 9:
Figure 10:
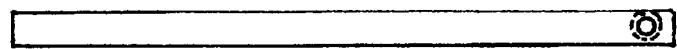

Made from round schedule 40 PVC pipe, a retainer tube 14 comprises a through hole on one end (FIG. 10) and a through slot beginning on the same end and in perpendicularity to the through-hole (FIG. 9). Length of the through slot is less than the overall length of retainer tube 14 (FIG. 9). A sparer tube 15 comprises a through hole. With the through hole in spacer tube 15 in alignment with the upper through hole in retainer tube 14, spacer tube 15 is disposed inside the through slot of retainer tube 14 (FIG. 9, 10). A stationary pin 13 is disposed within the alignment of an upper through of stationary tube 11, and the though hole in spacer tube 15, and the through hole in retainer tube 14, thus disposing retainer tube 14 inside stationary tube 11. Stationary pin 13 is longer than the diameter of stationary tube 11 thereby extending on each side of stationary tube 11. The bottom side of seat 2 comprises a flat-bottom hole and slot at the center point (FIG. 4, 5, 6). The top face of stationary tube 11 is disposed on the bottom of the flat bottom hole. The additional length of stationary pin 13 on each side of stationary tube 11 is disposed on the bottom of the pin slot (FIG. 5). The opposite side of stationary tube 13 is flush with the bottom of seat 2 (FIG. 5). Theretofore, attaching seat 2 to seat base 4 (FIGS. 7, 8) disposes stationary tube 11 and retainer tube 14 with spacer tube 15, as an assembly, within the embodiment.

FIGS. 11 to 22

Sliding tube 12 comprises an upper through hole and a lower through hole in longitudinal alignment, perpendicular to the longitudinally aligned plurality of through holes (FIG. 12). A Sliding pin 20 is disposed in the upper through hole of sliding tube 12. Both ends of sliding pin 20 are hammer forged flush with the outside surface of sliding tube 12, thereby permanently affixing sliding pin 20 in the upper through hole in sliding tube 12, and thereby preventing interference with the inside wall of stationary tube 11 (see FIGS. 12, 13). With sliding tube 12 fully retracted inside stationary tube 11, a lateral slot in the upper end of sliding tube 12 encompasses stationary pin 13 (FIG. 12).

Sliding pin 20 is slidably disposed inside the through slot in retainer tube 14, thus disposing retainer tube 14 inside sliding tube 12. When sliding tube 12 slides to the bottom of stationary tube 11 and wire lock pin 10 is not installed, sliding pin 20 will contact the bottom end of the through slot in retainer tube 14 thereby preventing sliding tube 12 from sliding out of stationary tube 11. Assuring free movement of pin 20, spacer tube 15 maintains sufficient width of the through slot in retainer tube 14. The through slot in retainer tube 14, in perpendicular alignment with the lower through hole in stationary tube 11, and encompassing sliding pin 20, maintains longitudinal alignment of the plurality of through-holes in sliding tube 12 and the lower through hole of stationary tube 11, thereby providing quick and easy insertion and removal of wire locking pin 10.

Sufficient is size to surround the outside diameter of sliding tube 12 (FIGS. 17, 18, 19), foot 6 comprises a through hole perpendicular to the top side and the underside. The through hole in foot 6 is countersunk on the underside (FIG. 18). A retention washer 16 has a center hole diameter equal to the through hole diameter in foot 6. With an outside diameter equal to the diameter of the countersunk hole, retention washer 16 is press fit into the bottom of the countersunk hole in foot 6 (FIG. 18, 19). With the bottom end of sliding tube 12 extending through the through hole of foot 6, a rotating pin 19 is disposed in the lower through hole in sliding tube 12 (FIG. 12). Comprising a length longer than the diameter of sliding tube 12 and disposed inside the countersunk hole on the bottom of foot 6, rotating pin 19 retains foot 6 on the lower end of sliding tube 12. Retention washer 16 provides wear protection between rotating pin 19 and bottom of countersunk hole in foot 6.

Sufficient in size to surround the outside diameter of sliding tube 12, the top side of stake base 7 comprises a flat bottom hole (FIG. 21). The flat bottom hole in stake base 7 comprises a slot in the bottom. A stationary washer 18 comprises a round bar member welded to its underside (FIGS. 14, 15, 16). Stationary washer 18 is disposed on the bottom of flat bottom hole in stake base 7 with the round bar disposed in the slot thereby preventing stationary washer 18 from rotating (FIG. 21,22). The bottom face of stationary tube 12 is pivotally disposed on top of stationary washer 18. Heretofore, stationary washer 18 provides vertical load support for sliding tube 12 and protects the bottom of the flat bottom hole in stake base 7 from wear. Sandwiched between stationary washer 18 and the bottom face of sliding tube 12, a rotating washer 17 provides a rotational bearing surface for the bottom face of sliding tube 12.

The under side of Stake base 7 comprises a slot, in perpendicular alignment with at slot. Disposed in the slots on the bottom of stake base 7, top stakes 8 and bottom stake 9 are attached to stake base 7. Comprising a pivotally mounted, non detachable assembly, stake base 7, with top stake 8 and bottom stake 9, is attached on center point to the bottom side of foot 6, heretofore encompassing stationary washer 18, rotating washer 17, the lower end of slider tube 12, rotating pin 19 and retention washer 16.

FIGS. 23 and 24

A strap 21 comprises of a lower section and an upper section. A D-Ring is permanently attached to one end of the upper section of strap 21 and the opposite end is permanently attached to a strap adjuster 23. A D-Ring is permanently attached to one end of the lower section of strap 21 and the opposite end is slidably attached to strap adjuster 23. A screw eye 24 is permanently attached to gusset 3. D-Ring 21 attached to the upper section of strap 21 is permanently attached to screw eye 24. D-Ring attached to the lower section of strap 21 is permanently attached to wire lock pin 10 thereby securing wire lock pin 10 to the embodiment.

Operation

Having sliding tube 12 locked in the fully retracted position inside stationary tube 11, the marsh duck hunting seat is typically carried with strap 21 adjusted to the preferred length. The top end of strap 21 is permanently attached to gusset 3. The bottom end of strap 21 is permanently attached to wire lock pin 10.

Seat 2 is rigidly attached, at a right angle, to the top of seat base 4. Gusset 3 rigidly attaches to opposite top sides of seat base 4 and adjacent bottom sides of seat 2. Stationary tube 11 is rigidly attached inside seat base 4. Retainer tube 14 is rigidly attached inside stationary tube 11, thus the stool needs no assembly/disassembly or folding/unfolding.

The seat and all rigidly attached members as heretofore described is adjusted to the desired height by first unlocking and removing wire lock pin 10 from the aligned through holes in stationary tube 11 and sliding tube 12. Wire lock pin 10 is secured to the bottom end of strap 12, thereby eliminating the fear of loss when removed from the through holes. Sliding tube 12 is then moved to a chosen position. The wire lock pin 10 is then re-inserted and locked in the aligned through holes thereby providing a failsafe connection between stationary tube 11 and sliding tube 12. Because sliding pin 20 in sliding tube 12 slides longitudinally inside the through slot in retainer tube 14, the chosen through hole in sliding tube 12 stays in alignment with the lower through hole in stationary tube 11 thereby providing quick and easy seat height adjustment.

If sliding tube 12 slides to its full extension without the wire lock pin 10 inserted in the aligned through holes in stationary tube 11 and sliding tube 12, then sliding pin 20 will encounter the bottom of the through slot in retainer tube 14 and thus prevent sliding tube 12 from sliding out of stationary tube 11.

The slot in the top end of sliding tube 20, encompassing stationary pin 13 when sliding tube 12 is fully retracted inside stationary tube 11, prevents sliding tube 12 from rotating inside stationary tube 11 if seat 2 is pivoted without the wire lock pin 10 inserted in the aligned through holes of stationary tube 12 and sliding tube 11, thus preventing twisting and damaging retainer tube 14.

Foot 6, stake base 7, top stake 8 and bottom stake 9 comprise a rigid assembly pivotally attached to the lower end of sliding tube 12. The rigid assembly as heretofore described encompasses a rotating pin 19 disposed in the lower through slot of sliding tube 12 thus retaining the assembly on the bottom end of sliding tube 12.

The rigid assembly of foot 6, stake base 7, top stake 8 and bottom stake 9, as heretofore described, encompasses a stationary washer 18 and rotating washer 17 onto which vertical, pivotal, loading from sliding tube 12 is urged.

Top stake 8 and bottom stake 9 are positioned into the ground. The wide, blunt profile of top stake 8 and bottom stake 9 in combination with foot 6, limits their penetration depth in soft ground thereby eliminating the need for further seat height adjustments. The wide profile of stake base 7 and top stake 8 and bottom stake 9 in combination with foot 6 provide side to side, fore and aft stability.

The flat side profile of top stake 8 and bottom stake 9 provide rotational resistance when embedded in soft ground thereby allowing proper functionality of the seat pivoting mechanism encompassed in the heretofore described pivotally disposed foot 6, stake base 7, top stake 8, and bottom stake 9 assembly.

After use, top stake 8 and bottom stake 9 are removed from the ground. The wire locking pin (10) is unlocked and removed from the aligned through holes in stationary tube 11 and sliding tube 12. Sliding tube 12 is fully retracted to its shortest position. Wire locking pin (10) is re-inserted and locked in the aligned through holes.

The marsh duck hunting seat is thereby ready for transport.

Conclusion, Ramifications, Scope

Thus the reader will see that at least on embodiment of the marsh duck hunting stool provides more advantages and fewer disadvantages to the marsh duck hunter as follows:

Comprising construction using predetermined proportions of floatable material, schedule 40 PVC pipe, metal, and nylon members, the marsh duck hunter stool will float, thereby reducing the fear of loss.

Comprising lightweight (less than 5 lbs.) and compact size (less than 22" shortest length, the marsh duck hunter stool is easier to transport.

Comprising unitary construction with non detachable members, the marsh duck hunting stool is easier to use since no assembly/disassembly or folding/unfolding is needed.

Comprising unitary construction, fear of loss of any member is eliminated.

Comprising a pivotally attached lower foot and stake base, the seat will pivot 360 degrees allowing easier tracking of birds in flight Comprising a pivotally attached lower foot and stake base, the seat attachment to the seat base can be rigid and reinforced, thereby providing more strength and durability at this high stress point.

Comprising a blunt shape and in combination with a flat foot, the stakes provide greater resistance to ground penetration thereby eliminating the need to re adjust seat height.

Comprising a wider profile, the stakes and stake base provide better side to side, fore and aft stability.

Comprising tapered bottom ends the stakes facilitate easier penetration of the underwater vegetative conditions in the duck marsh.

Comprising a sliding, vertically disposed tube inside a vertically disposed stationary tube, the seat height can be adjusted to accommodate various water depths.

Comprising self alignment of the longitudinally disposed seat height adjustment holes, the seat height is easier and quicker to set.

While the above description contains many specificities, these should not be construed as limitations on the scope, but rather as an exemplification of one embodiment thereof. Many other variations are possible. For example, the width and length of seat and seat base can vary, the seat base can be made from a single piece, the seat height can be taller or shorter, the foot size can vary, and the stake base size can vary. Furthermore, the embodiment title of "marsh duck hunting stool" should not be construed as limiting in scope, but rather as an exemplification of one embodiment thereof. For example, other possible uses would be, but not limited to, for fishing or field hunting.

Accordingly, the scope should be determined not by the embodiment illustrated, but by the appended claims and their legal equivalents.

We claim:

1. A device for a human to sit on comprising,
   a. a seat, having a horizontal orientation, sufficient in size to support a human, and
   b. a seat base, having an elongated hollow center, with a top end rigidly attached, at a right angle, to an underside of said seat, and
   c. two gussets, rigidly attached to opposite sides of said top end of said seat base and the adjacent said underside of said seat, and
   d. a stationary tube, rigidly attached inside said seat base, and
   e. an end cap, rigidly attached to a lower end of said seat base and surrounding said stationary tube, and
   f. a retainer tube, rigidly attached inside said stationary tube, and
   g. a sliding tube, slidably disposed inside said stationary tube and surrounding said retainer tube, and
   h. a foot, pivotally attached to a lower end of said sliding tube, and
   i. a stake base, rigidly attached to an underside of said foot, and
   j. a top stake and a bottom stake, rigidly attached to an underside of said stake base, and
   k. a strap, attached to said gusset on one end and said wire lock pin on the opposite end.

2. The device for a human to sit on of claim 1 wherein said seat, said seat base, said gussets, said end cap, said foot, said stake base, and said stakes are made from floatable material.

3. The device for a human to sit on of claim 1 wherein said stationary tube, said sliding tube, and said retainer tube are made from round, schedule 40 PVC pipe.

4. The device for a human to sit on of claim 1 wherein the underside of said seat further includes a flat bottom hole surrounding an upper end of said stationary tube.

5. The device for a human to sit on of claim 1 wherein the underside of said seat further includes a slot.

6. The device for human to sit on of claim 5 further includes a stationary pin disposed in said slot means for securing stationary tube and said retainer tube inside said seat base.

7. The device for a human to sit on of claim 1 wherein said retainer tube further includes a through slot of partial length, longitudinally oriented.

8. The device for a human to sit on of claim 7, further includes a sliding pin slidably disposed in said through slot, means for retaining said sliding tube inside said stationary tube and providing longitudinal alignment of said sliding tube with said stationary tube.

9. The device for a human to sit on of claim 1 further includes a countersunk hole on said underside of said foot.

10. The device for a human to sit on of claim 9 further includes a rotating pin surrounded by said countersunk hole means for retaining said foot on a lower end of said sliding tube.

11. The device for a human to sit on of claim 10, said stakes comprise a wide, blunt profile.

12. The device for a human to sit on of claim 9 further includes a retention washer surrounded by said countersunk hole, means for protecting said foot against wear.

13. The device for a human to sit on of claim 1 wherein a said stake base further includes a flat bottom hole.

14. The device for a human to sit on of claim 7 further includes is a stationary pin disposed, in a non-rotational manner, on the bottom of said flat bottom hole.

15. The device for a human to sit on of claim 1 wherein stakes are interlocking.

* * * * *